United States Patent [19]

Schexnayder

[11] 3,817,276

[45] June 18, 1974

[54] SELF-ALIGNING RELIEF VALVE

[75] Inventor: Lawrence F. Schexnayder, Joliet, Ill.

[73] Assignee: Caterpillar Tractor Co., Peoria, Ill.

[22] Filed: Mar. 5, 1973

[21] Appl. No.: 337,891

[52] U.S. Cl. .............................................. 137/491
[51] Int. Cl. ............................................ F16k 31/12
[58] Field of Search ........ 137/491, 488, 490, 489.3, 137/596.12, 596.13, 596.2

[56] References Cited
UNITED STATES PATENTS

| | | | |
|---|---|---|---|
| 582,445 | 5/1897 | Tippett | 137/491 |
| 2,619,112 | 11/1952 | Renick | 137/491 X |
| 2,667,893 | 2/1954 | Kupiec | 137/490 X |
| 2,759,487 | 8/1956 | Lornitzo | 137/490 |
| 2,821,996 | 2/1958 | Stevenson | 137/490 |
| 2,882,922 | 4/1959 | Schindel | 137/491 |
| 3,160,076 | 12/1964 | Martin | 137/491 UX |
| 3,164,166 | 1/1965 | Tennis | 137/491 |
| 3,318,326 | 5/1967 | Nevuhs | 137/491 |
| 3,744,518 | 7/1973 | Stacey | 137/596.12 |

Primary Examiner—Henry T. Klinksiek
Assistant Examiner—Robert J. Miller
Attorney, Agent, or Firm—Ralph E. Walters

[57] ABSTRACT

A self-aligning relief valve disposed within a body having a valve bore providing an annular valve seat therein disposed intermediate a relatively high pressure zone and a low pressure zone with a dump valve loosely slidably fitted in the valve bore in alignment seeking relation and resiliently biased engagement with the seat including a control device slidably and sealingly disposed in the dump valve for controlling communication between the high pressure zone and the low pressure zone with the control device carried and guided exclusively within the dump valve to afford a dependable seal between the relatively high and low pressure zones and is permitted to float with the dump valve during its alignment seeking engagement with the annular seat.

15 Claims, 1 Drawing Figure

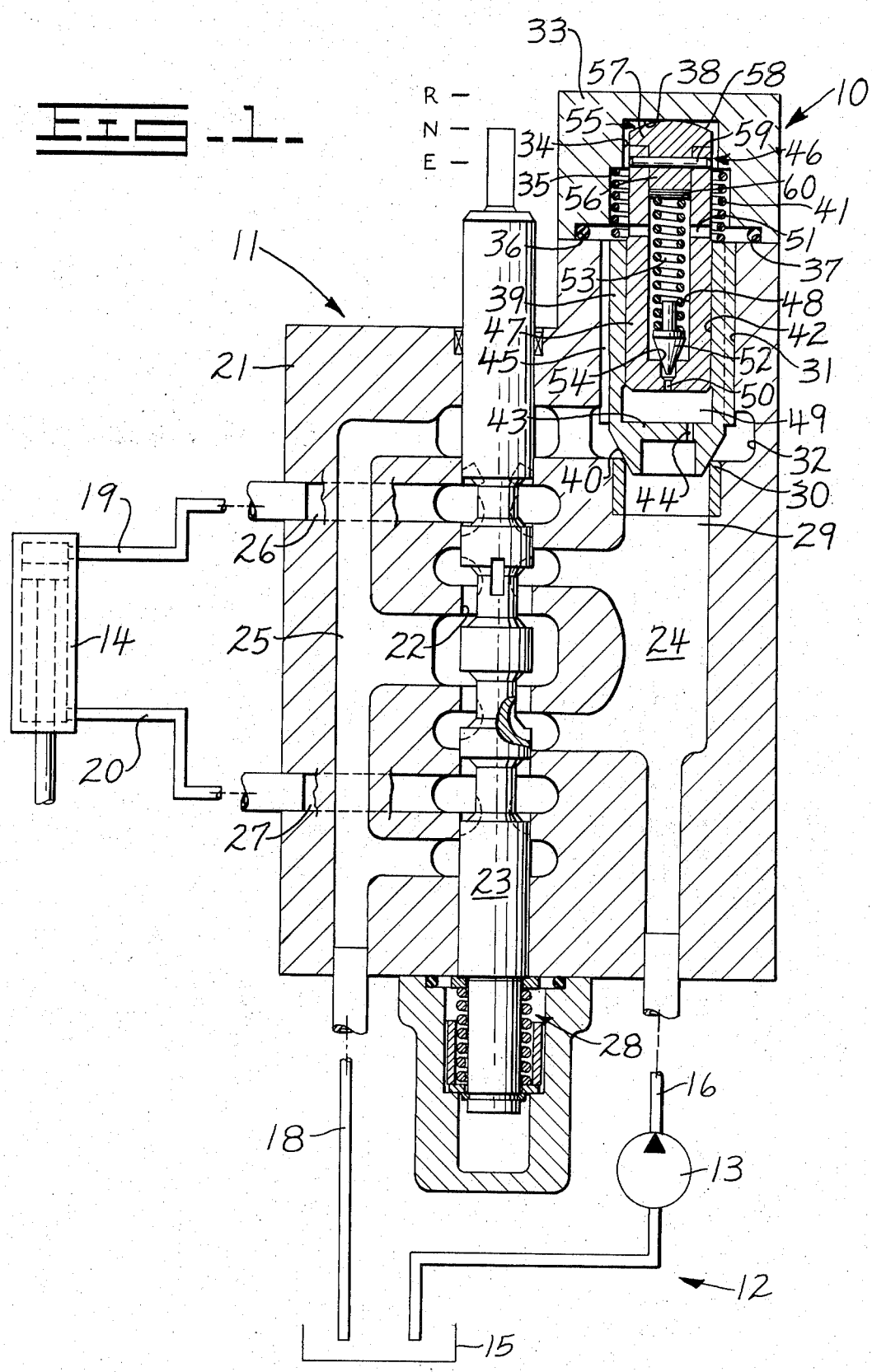

SELF-ALIGNING RELIEF VALVE

BACKGROUND OF THE INVENTION

Fluid pressure relief valves, particularly those for high pressure systems, commonly require precision close-tolerance machining to provide sliding seal fits between the various parts. In an effort to avoid concentricity problems between separable parts, the relief poppet portion of the relief valve is normally carried in a separable body member remote from the main dump spool of the relief valve, the nonseating end of which must then be totally exposed to the high pressure side of the valve. This normally results in a larger relief valve having more parts imposing additional sealing problems and considerable added expense in the manufacture of the valve. For example, a separate cartridge-type valve is sometimes provided which is threaded or press-fitted in the valve body and which includes its own valve bore and seat in an effort to overcome the concentricity and tolerance problems. Since the points of sliding sealing contact within the valve are normally select fit, service replacement requires removal and replacement of the complete cartridge.

SUMMARY AND OBJECTS OF THIS INVENTION

Accordingly, it is an object of this invention to provide an improved self-aligning relief valve having only a minimum of parts which simplifies manufacture and reduces cost thereof.

Another object of this invention is to provide such an improved relief valve which minimizes precision machining by automatic self-alignment of the internal components of the relief valve.

Another object of this invention is to provide an improved relief valve of the character described which affords improved response and allows service replacement of the working components without replacement of the valve body.

Other objects and advantages of the present invention will become more readily apparent upon reference to the accompanying drawing and following description.

BRIEF DESCRIPTION OF THE DRAWING

FIG. 1 is a schematic diagram of a fluid circuit with sectional valve portions embodying the principles of the present invention.

DESCRIPTION OF THE PREFERRED EMBODIMENT

With particular reference to the drawing, an improved self-aligning fluid pressure relief valve is generally designated by the reference numeral 10 as operatively installed in the main body of a directional control valve generally designated by the reference numeral 11. The control valve 11 is incorporated in a hydraulic control system 12 which includes a pump 13 and a motor 14. The pump 13 draws fluid from a reservoir 15 for supply through a line 16 to the valve 11. A return line 18 communicates between the valve and the reservoir for return of spent oil from the system. A pair of motor lines 19 and 20 also communicate between the valve 11 and the motor 14 which in this case is illustrated as a double acting jack.

Directional control valve 11 is illustrated as an open-center type including a body 21 having a bore 22 extending longitudinally therethrough for reciprocably housing an elongated directional control spool 23. The body 21 includes an inlet port 24 which is in fluid communication with the line 16 to receive pressurized oil from the pump 13 such that it constitutes a relatively high pressure zone. A return passage 25 in the body 21 communicates between the bore 22 and the return line 18. A pair of motor ports 26 and 27 communicate between the motor lines 19 and 20, respectively, and the bore 22 at longitudinally spaced points therealong in a usual manner.

Spool 23 is normally held in the centered neutral position, as shown, by a centering spring mechanism indicated generally at 28 whereby the output of the pump 13 is passed from the inlet port 24 to the return passage 25 for return to the reservoir 15.

The inlet port 24 includes a branch passage 29 which communicates through an annular valve seat 30 with the inner end of a coaxially disposed bore 31 formed in the body 21. The outer end of bore 31 opens exteriorly of the body 21. An annular groove 32 is formed in the body in circumscribing relation to the inner end of the bore 31 adjacent the valve seat 30. The annular groove is in constant open communication with the return passage 25. A cover 33 having a stepped bore 34 therein is removably secured to the body 21 in closing relation to the bore 31 and with the stepped bore in coaxial end-to-end alignment therewith. The stepped bore defines a shoulder 35 intermediate its ends and terminates at its open end with a counterbore 36 which receives an O-ring 37 for sealing between the cover and the body 21. The outer closed end of the stepped bore provides a stop surface 38.

A main dump valve 39 is loosely and slidably fitted in the bore 31 for sealing engagement with the valve seat 30. The dump valve includes a frustoconical seating portion 40 adapted for sealing engagement with the valve seat 30. A compression spring 41 is interposed the dump valve and the shoulder 35 for urging the dump valve toward the valve seat. A control bore 42 is provided in the dump valve and terminates short of the seating portion to provide a partition 43 separating the control bore from the inlet port 24. An orifice 44 is provided through the partition 43 so as to provide restricted communication between the inlet port and the control bore. The orifice is radially offset from the longitudinal center of the dump valve for purposes explained hereinafter.

The dump valve 39 is further provided with a plurality of longitudinal grooves 45 formed in the outer peripheral surface thereof for communication between the stepped bore 34 and the annular groove 32. Since the annular groove is in open communication with the reservoir 15 as previously described, the stepped bore 34 defines a low pressure zone to which the outer end of the dump valve is exposed.

The spring 41 is relatively light to merely insure closing of the dump valve 39. Accordingly, a pilot valve assembly 46 is associated therewith for establishing the predetermined maximum system pressure at which the dump valve will open. The pilot valve assembly has a pilot body 47 providing a bore 48 with the body being slidably and sealingly fitted within the control bore 42 of the dump valve to define therein control chamber 49. The inner end of the pilot valve bore 48 communicates by way of a centrally disposed passage 50 with the control chamber 49. The pilot valve body also includes a plurality of radial ports 51 which are longitudinally spaced from the control chamber to communicate the pilot valve bore with the low pressure area defined by the stepped bore 34.

A pilot poppet 52 is disposed in the pilot valve bore 48 and is resiliently biased by a spring 53 into sealing relationship with a seat 54 provided by the intersection of passage 50 and the pilot valve bore normally to block communication between control chamber 49 and the bore.

A reaction cap 55 includes a reduced diameter extension 56 which is received within the outer portion of the pilot valve bore 48. The cap has an enlarged head 57 engaging the outer end of the pilot body 47 with the head having an outer spherically generated end surface 58. A retaining pin 59 is extended through suitably aligned holes in the extension 56 and pilot valve body to retain the cap 55 in its described position. The spring 53 is interposed the extension 56 and the pilot poppet 52 and any suitable number of shims 60 may be provided between the spring and the extension selectively to adjust the force of the spring 53. This particular construction permits convenient bench assembly and testing of the relief valve setting prior to installation into the valve 11.

An important aspect of the present invention resides in the fact that the pilot valve assembly 46 is carried and guided exclusively by its sliding sealed fit within the control bore 42 of dump valve 39. The pilot valve assembly is restrained from movement axially outwardly of the bore 42 by substantially point contact of the arcuate surface 58 with the stop surface 38 of the cover 33.

OPERATION

While the operation of the present invention is believed clearly apparent from the foregoing description, further amplification will subsequently be made in the following brief summary of such operation. With the directional control spool 23 in the centered neutral position as shown, the output of pump 13 is directed by way of inlet port 24 across the open center section of the control valve to the return passage 25 and thence to reservoir 15 by way of return line 18.

When the spool 23 is moved upwardly to the raised position indicated "R," the fluid output of pump 13 is directed from inlet port 24 to the head end of jack 14 by way of motor port 26 and line 19. The pressure in the control system 12 required for extension of the jack 14 is communicated from the inlet port to the control chamber 49 by way of the orifice 44. Should the jack encounter some externally imposed resistance to movement which causes the working pressure in the control system to exceed a predetermined safe maximum, the pilot poppet 52 opens under the influence of such excess pressure in control chamber 49. This is effective to vent the control chamber to the reservoir by way of passage 50, pilot valve bore 48, radial ports 51, grooves 45, annular groove 32 and return passage 25. The pressure differential generated across the orifice 44 permits the pressure in inlet port 24 acting on the partition 43 to move the main dump valve 39 away from the seat 30. This is effective to relieve the pump output to the reservoir by way of the annular groove 32, the return passage 25, and the return line 18. Since the orifice is radially offset from the passage 50, the high velocity flow through the orifice is prevented from impinging directly on the pilot poppet 52. As a result, stability of the valve is enhanced and regulation of the fluid pressure is improved.

Upon removal of the described resistance to movement of the jack 14, the working pressure in the control system 12 is reduced which allows the pilot poppet 52 to be reseated by its spring 54 to block the passage 50. This allows the pressure in control chamber 49 to equalize with that in the inlet port 24 by way of the orifice 44 whereby the force of the spring 41 is effective to urge the dump valve 39 into seating engagement with the annular seat 30. The relatively loose fit of the dump valve in the bore 31 allows the dump valve to seek a position precisely aligned with the valve seat 30 to insure complete sealing between the high pressure inlet port 24 and the low pressure return passage 25.

The high pressure control chamber 49 is effectively isolated from the low pressure area defined by the stepped bore 34 by the internally disposed sliding sealed fit of the pilot valve assembly 46 in the control bore 42. Since the pilot valve assembly is carried and guided exclusively by the dump valve and affords such a dependable seal between the high and low pressure zones in this internally substantially buried location, the main dump valve 39 is thereby permitted to have sufficient radial freedom to seek its own position during inward movement in self-aligning effective sealing engagement with the annular seat 30.

The above described construction of the present invention permits convenient and inexpensive servicing of the internal components of the relief valve. Should the dump valve 39 or the components of the pilot valve assembly 46 become excessively worn or damaged, they may be readily replaced. This is accomplished by removing the cover 33 which allows ready removal of the defective dump valve and pilot valve assembly as a unit for replacement by a new select fit assembly with the assurance of continued optimum relief valve operation with the new components in the existing valve body. The cover 33 is then reinstalled and the system is again ready for operation.

In view of the foregoing, it is readily apparent that the structure of the present invention provides an improved self-aligning relief valve which simplifies manufacture and minimizes precision machining by permitting automatic self-alignment of the internal working components of the relief valve in the valve body. The structure of the present invention further affords improved response of the maximum pressure in the system and allows convenient and inexpensive service replacement of the working components within the existing valve body.

The relatively loose fit of the dump valve 39 in the bore 31 is permitted by the internally sealing structure of the present invention which is effective to isolate the interface between the dump valve and the bore from the relatively high pressure zones of the relief valve while only exposing the interface to the relatively low pressure area defined by the stepped bore 34. As previously described in connection with conventional relief valves, the structures of the prior art normally expose the end of the dump valve opposite to its seating end to the high pressure zone within the relief valve which imposes onerous fluid sealing problems particularly in the interface between the dump valve and its receiving receptacle in the relief valve body. Such sealing problem requires the dump valve receptacle to be tightly secured in the valve body as by press-fitting, screw-threading or the like, which necessitates precise machining of the dump valve and its receptacle including the valve seat provided therein. The need for such critical tolerances is completely eliminated by the structure of the present invention in view of its unique self-aligning feature. Furthermore, confinement of the high fluid pressure zone to a location deeply within the working components of the relief valve obviates any external sealing problems and virtually precludes any leakage from the valve outwardly of the body as frequently occurs with conventional relief valves.

While the invention has been described and shown with particular reference to the preferred embodiment, it will be apparent that variations might be possible that would fall within the scope of the present invention which is not intended to be limited except as defined in the following claims.

What is claimed is:

1. A self-aligning relief valve, comprising;
   a body having a valve bore providing an annular valve seat therein disposed intermediate a relatively high pressure zone and a low pressure zone;
   dump valve means retainably loosely slidably fitted in said valve bore for limited radial movement therein, said dump valve means being in alignment seeking relation and resiliently biased engagement with said valve seat; and
   control means telescopically slidably sealingly disposed in said dump valve means for controlling communication between said high pressure zone and said low pressure zone with said control means carried and guided exclusively within said dump valve means to afford a dependable seal between said relatively high and low pressure zones, said control means being permitted freely to float radially with said dump valve means during its alignment seeking engagement with the valve seat.

2. The self-aligning relief valve of claim 1 wherein said dump valve means includes a control bore with said control means telescopically slidably sealingly disposed in said control bore to form therein a control chamber, and orifice means providing restricted communication between said high pressure zone and said control chamber to permit equalization of pressure thereacross when communication between said relatively high and low pressure zones is blocked by said control means.

3. The self-aligning relief valve of claim 2 including restraining means secured to said body for load supporting axially directed face contact with said control means to limit movement of said control means outwardly of said control bore.

4. The self-aligning relief valve of claim 3 including a drain passage communicating with said valve bore adjacent said valve seat and passage means communicating the low pressure zone with said drain passage.

5. The self-aligning relief valve of claim 4 wherein said passage means include a longitudinal groove formed in the outer peripheral surface of said dump valve.

6. The self-aligning relief valve of claim 5 wherein said control means is a pilot control valve responsive to fluid pressure in said control chamber selectively to permit fluid flow between said control chamber and the low pressure zone when the pressure in said control chamber exceeds a predetermined level.

7. The self-aligning relief valve of claim 6 wherein said dump valve means includes an actuating area exposed to fluid pressure in the high pressure zone to generate a valve opening force and an actuating area exposed to fluid pressure in said control chamber to generate a valve closing force at least as great as said valve opening force when communication between said control chamber and said low pressure zone is blocked.

8. The self-aligning relief valve of claim 7 wherein said pilot control valve includes a cylindrical pilot body having inner and outer ends in which said inner end cooperates with said control bore to form said control chamber and said outer end includes a spherical outer face for substantially point contact with said restraining means, said cylindrical pilot body further defining a vent passage communicating between said control chamber and said low pressure zone, and a resiliently biased pilot poppet disposed in said vent passage normaly to block communication between said control chamber and said low pressure zone and responsive to said predetermined pressure level in said control chamber selectively to permit venting of fluid pressure therefrom through said vent passage.

9. The self-aligning relief valve of claim 8 wherein said restraining means includes a cover having an inner surface for closing the outer end of said valve bore and defining therewith said low pressure zone and for substantially point load supporting contact with said spherical outer face of said cylindrical pilot body.

10. The self-aligning relief valve of claim 9 wherein said cover includes a stepped bore having an outer closed end and an inner open end and defining an annular shoulder intermediate said ends, and a compression spring disposed in biasing relation between said annular shoulder of the stepped bore and said dump valve to urge said dump valve toward said valve seat.

11. A self-aligning relief valve for controlling the maximum pressure in a fluid circuit having a main body defining a pressure passage and a drain passage with a bypass passage having a valve seat communicating therebetween, comprising;
   means forming a valve bore in the main body for communication with said bypass passage and said drain passage;
   dump valve means retainably loosely slidably fitted in said valve bore in alignment seeking relation with the valve seat for resiliently biased seating engagement therewith to block communication between the bypass passage and the drain passage, said dump valve means including a control bore, an inner end of which has restricted communication with the pressure passage with an outer end thereof having relatively unrestricted communication with the drain passage;
   a cover secured to said main body and defining a stepped bore having a closed end and an open end in axially aligned communicating relation to said valve bore;
   means forming a flow path between said stepped bore and the drain passage whereby said stepped bore constitutes a low pressure zone; and
   pilot valve means including a pilot body slidably and sealingly disposed in said control bore to form therein a control chamber and including an outer end opposite said control chamber for load supporting axial face contact with said closed end of said stepped bore to limit axial movement of said pilot body outwardly of said control bore, said pilot body defining a centrally disposed vent passage therethrough communicating said control chamber with said low pressure zone, and a resiliently biased poppet valve normally closing said vent passage and responsive to a predetermined pressure level in said control chamber to vent pressure therefrom to allow said dump valve means to open and communicate the pressure passage with the drain passage.

12. The self-aligning relief valve of claim 11 wherein said means forming a flow path between the stepped bore and the drain passage includes at least one longitudinal groove formed in the outer peripheral surface of said dump valve means.

13. The self-aligning relief valve of claim 12 wherein said outer end of the pilot body includes an axially facing arcuately convex surface for substantially point contact with said closed end of said stepped bore.

14. The self-aligning relief valve of claim 13 wherein said dump valve means includes a poppet spool having an inner conical end for seating engagement with the valve seat and including a partition adjacent said conical end interposed said control chamber and said pressure passage, and said restricted communication between said control chamber and said pressure passage constitutes an orifice extending through said partition.

15. The self-aligning relief valve of claim 12 wherein said orifice is radially offset with respect to said centrally disposed vent passage to prevent high velocity impingement of fluid flowing through said orifice on said pilot poppet.

* * * * *